3,075,550
FLOW CONTROL VALVE MECHANISM
Philip Keith, McHenry, Ill., assignor to International Harvester Company, Chicago, Ill., a corporation of New Jersey
Filed Dec. 30, 1960, Ser. No. 79,632
7 Claims. (Cl. 137—599)

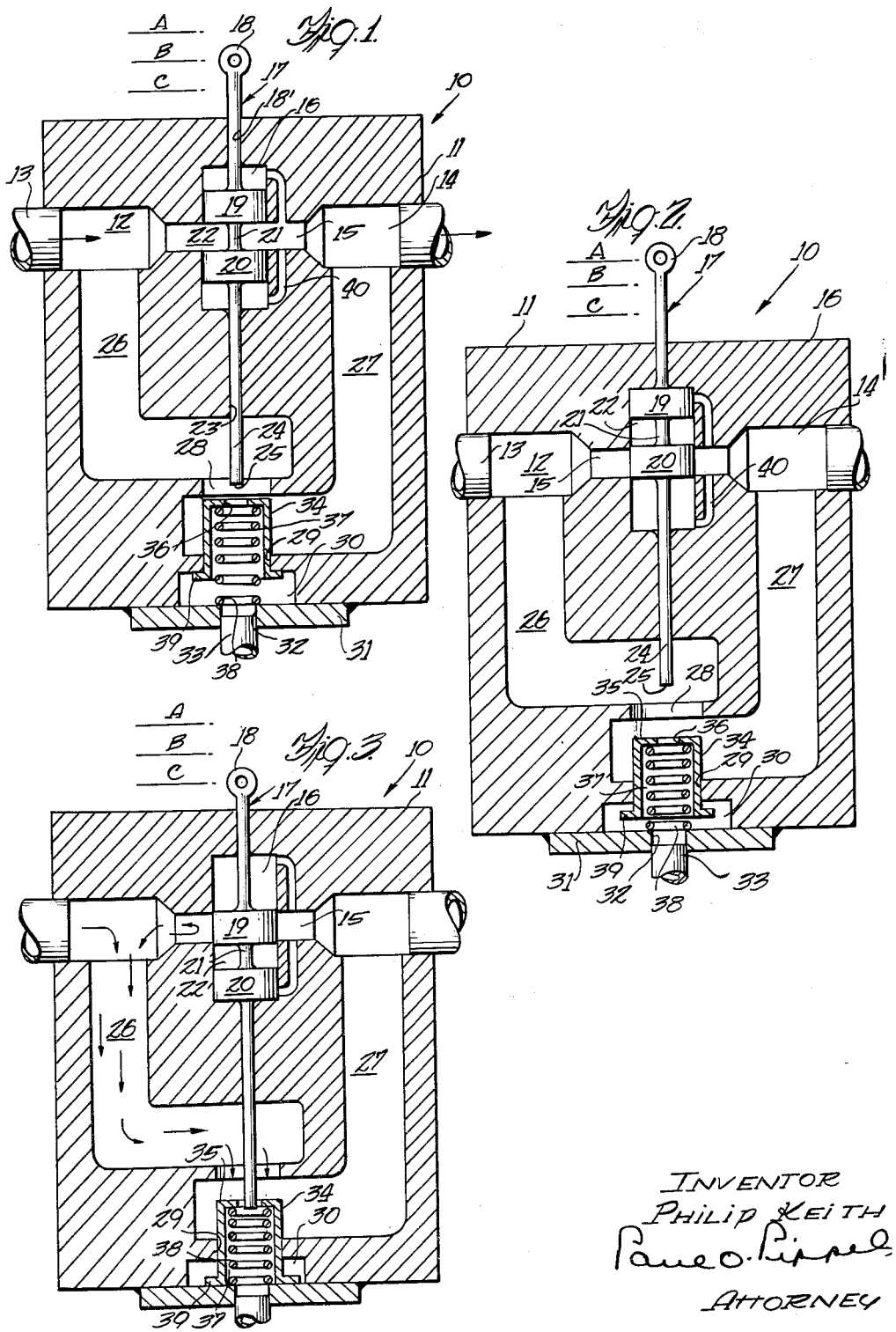

This invention relates to a flow control device and more particularly to a valve mechanism for dividing the flow of fluids between certain operating connections.

It is a prime object of this invention to provide an improved valve mechanism designed particularly to supply fluid under pressure to a fluid motor such as a fluid extensible ram.

Another object of this invention is to provide a simple and effective flow divider adapted to be quickly and easily manipulated for delivering variable volumes of fluid to an actuator such as a fluid extensible device.

Still another more specific object is to provide an improved flow divider having a single operating valve which during movement to two positions is effective to divide the flow of fluid from a source under pressure in such a manner as to provide a variable volume flow to a fluid motor to meet different requirements of the same.

A more specific object of the invention is to provide a fluid divider having a valve mechanism adapted to be quickly moved into at least two positions to control the flow of fluid through a single poppet-type valve, the said valve mechanism including cooperating means which is cooperable with the poppet valve to provide for a lesser volume fluid flow in one position.

A still more specific object of the invention is to provide an improved flow control valve having a spool-type plunger adapted to be shifted from a neutral open, into two closed positions, the said mechanism including a poppet-type valve having a restricted orifice which during one closed position of the spool valve provides for a certain limited flow through the said orifice to an operating conduit, the said spool valve also including a masking stem or element movable during a second closed position of the spool valve into masking relation with respect to the orifice whereby the flow through said orifice is further restricted with respect to the operating conduit.

These and other objects will become more readily apparent from a reading of the specification when examined in connection with the accompanying sheet of drawing.

In the drawing:

FIGURE 1 is a cross-sectional view through a flow control valve or flow dividing mechanism showing a neutral position of the same;

FIGURE 2 is a cross-sectional view similar to FIGURE 1 showing a first flow dividing position of the said mechanism; and FIGURE 3 is a cross-sectional view similar to FIGURES 1 and 2 showing however the valve mechanism in a second fluid dividing position.

Referring now to the figures a flow control valve or flow dividing mechanism is generally designated by the reference character 10. The device 10 comprises a casing or housing 11 having at its upper end an inlet bore ing or passage 12 in communication with a conduit 13 adapted to connect to a suitable source of pressure (not shown). The casing 11 is also provided with an outlet bore or passage 14 which is concentric with the bore 12. The passages 12 and 14 are in communication by means of a valve passage 15 of lesser diameter than the diameter of the bores 12 and 14.

Located centrally within the casing is a recess 16 which extends transversely with respect to the passage 15 and intersects the same as indicated. A valve plunger 17 includes a control rod 18 slidable in a bore 18' the said control rod 18 having connected thereto lands 19 and 20 which are suitably spaced by means of a connecting rod portion 21 to provide a spool-shaped structure having a circumferential groove 22. The casing is further provided with a bore 23 concentric with the bore 18' in which is slidingly positioned a valve stem portion 24 suitably connected to the land 20, being concentric with the rod 18, and having at its lower end a flat face 25.

An L-shaped divider passage 26 communicates with the inlet passage 12 and has a portion thereof projecting axially below the recess 16. The casing is further provided with an L-shaped return passage 27 which communicates with the bore 14 the said return passage 27 having an L-shaped portion also projecting below the recess 16 so that the projecting portions of the passages 26 and 27 in effect may be said to overlap within the casing 11.

The casing 11 is further provided with a valve opening 28 concentrically disposed with respect to the valve plunger 17 and adapted to provide for communication between the divider passage 26 and the return passage 27. A bore 29 on the casing 11 is positioned concentrically below the valve opening 28 and the annular recess 30 is disposed below the bore 29 in the casing 11. A plate 31 is suitably connected over the lower end of the recess 30 and is provided with a suitably threaded bore 32 to which a conduit 33 is connected, the said conduit 33 communicating with a suitable fluid motor such as a fluid extensible device, or hydraulic ram (not shown) as desired.

A thimble-shaped poppet valve 34 is suitably slidably disposed within the bore 29 and may be moved toward and away from the valve opening 28 as indicated below. The poppet valve 34 is provided at its upper end with a piston surface 35 which is provided with a restricted opening 36 axially in alignment or concentric with respect to the stem 24 and the flat face 25. The poppet valve 34 is provided with an inner hollow cavity 37. A spring 38 is disposed within the cavity 37 and is suitably retained within the recess 30 for normally urging the poppet valve 34 toward the opening 28 to restrict the flow therethrough from the passage 26 to the passage 27. The lower end of the poppet 34 is provided with an annular flange 39 limiting the upper movement of the poppet valve 34 as best shown in FIGURE 1. The casing 11 is also provided with a U-shaped passage 40 providing for communication between the opposed ends of the recess 16 so that any fluid which may leak into said ends of the recess 16 will not restrain sliding movement of the valve 17.

In the operation, the valve 17 is movable to positions A, B, and C. In the position B shown in FIGURE 1, a neutral position is effected and fluid under pressure from the conduit 13 flows directly through the inlet passage 12 through the valve passage 15 to the outlet passage 14 and to a suitable fluid reservoir (not shown). The conduit 33 is connected to the fluid motor or fluid extensible device which is to be controlled and which is to be operated. Additional such connections can, of course, be effected for controlling additional fluid motors as desired. In the operation, for example of a bulldozer, the fluid extensible devices which normally operate such motor may require only a portion of the fluid flow or volume which is delivered to the inlet 12. For instance 140 gallons per minute may be directed to the inlet 12 while during normal operation only 30 gallons may be required to actuate the fluid motor which is connected to the conduit 33. In the neutral position shown in FIGURE 1 the direct flow is to the outlet 14 and relatively small volume of fluid is bypassed from the passage 26 to the passage 27 and to the return conduit 14. In FIGURE 2 the valve 17 is moved to the position designated by A and the land 20 blocks the valve passage 15 whereupon the fluid flow is directed to the flow divider passage 26. The fluid flow therefore may be the full 140 gallons per minute which enters into the inlet passage 12 and the poppet 34 is forced downwardly against the spring 38 until a balance is achieved between the the force on the piston face 35 and the spring 38 as shown, whereupon a predetermined quantity of 30 gallons per minute flows through the restrictive opening 36 and to the conduit 33 for operation of the desired fluid motor The remainder of the fluid is diverted to the passage 27 and to the return outlet 14.

In the position shown in FIGURE 3 the valve 17 has been moved to the position indicated at C and this movement provides for a decrease in the volume of liquid flowing through the opening 36 to the conduit 38. The land 19 now covers the passage 15 and the 140 gallons per minute flow is again through the passage 26 and through the opening 28. The face 25 of the stem 24 has been moved into projecting relation within the opening 36 to restrict the area so that a further restricted flow takes place and approximately 15 gallons per minute are flowing through the passage 36 to the conduit 33. Again the remainder of the fluid is free to flow to the return passage 27 and to the outlet passage 14. It is, of course, obvious that the area of the face 25 may be reduced or increased as desired and that the masking effect that the face 25 has on the opening 36 determines the amount of fluid flow through said opening in the position shown in FIGURE 3.

Thus a simple flow control valve has been provided which will, effectively, control the flow of fluid to a fluid motor having certain flow control requirements. By the simple operation of one valve plunger, the variable flow of fluid to the fluid motor is accomplished.

Thus it is believed that the objects of the invention have been fully achieved and that a new and improved flow control device is disclosed. Modifications and changes may be made of course in the present structure without departing from the spirit of the invention as disclosed or from the scope thereof as defined in the appended claims.

What is claimed is:

1. A flow control device comprising a housing having an inlet passage and an outlet passage in concentric alignment, a valve passage concentric with and connecting said inlet and outlet passages, a recess in said housing extending transversely on opposite sides of said valve passage and intersecting the same, a divider passage communicating with said inlet passage, a valve plunger, said plunger including axially spaced lands and a circumferential groove slidably disposed in said recess, said groove and lands being registerable with said valve passage for respectively opening and closing said passage, a return passage on said casing communicating with said outlet passage, said casing including a valve opening communicating with said divider passage and said return passage, said opening being axially disposed relative to said valve plunger, a poppet valve on said casing movable toward and away from said valve opening, means urging said poppet valve toward said valve opening, said poppet valve having a restricted orifice, a conduit communicating with said orifice, said valve plunger in open position providing for the flow of fluid from said inlet passage through said valve passage to said outlet passage, said valve plunger in a first closed position providing for the maximum flow of fluid from the inlet passage to said divider passage, whereby a certain volume of fluid flows through said orifice to said conduit and the rest of said fluid flows through said return conduit to said discharge passage, and a stem on said valve plunger movable therewith to a second closed position whereby said stem projects into said orifice to restrict the flow therethrough whereby a lesser volume of fluid is delivered to said conduit and the remainder of fluid flow is delivered to said return passage.

2. A flow control device comprising a housing having an inlet passage and an outlet passage in concentric alignment, a valve passage concentric with and connecting said inlet and outlet passages, a recess in said housing extending transversely on opposite sides of said valve passage and intersecting the same, a divider passage communicating with said inlet passage, a valve plunger, said plunger including axially spaced lands and a circumferential groove slidably disposed in said recess, said groove and lands being registerable with said valve passage for respectively opening and closing said passage, a return passage on said casing communicating with said outlet passage, said casing including a valve opening communicating with said divider passage and said return passage, said opening being axially disposed relative to said valve plunger, a poppet valve on said casing movable toward and away from said valve opening, means urging said poppet valve toward said valve opening, said poppet valve having a restricted orifice, a conduit communicating with said orifice, said valve plunger in open position providing for the flow of fluid from said inlet passage through said valve passage to said outlet passage, said valve plunger in a first closed position providing for the maximum flow of fluid from the inlet passage to said divider passage, whereby a certain volume of fluid flows through said orifice to said conduit and the rest of said fluid flows through said return conduit to said discharge passage, and blocking means on said valve plunger movable therewith to a second closed position whereby said blocking means partially blocks said orifice to restrict the flow therethrough whereby a lesser volume of fluid is delivered to said conduit and the remainder of fluid flow is delivered to said return passage.

3. A flow control device comprising a housing having an inlet passage and an outlet passage in concentric alignment, a valve passage concentric with and connecting said inlet and outlet passages, a divider passage communicating with said inlet passage, a valve plunger, said plunger including axially spaced lands and a circumferential groove slidably disposed in said housing, said groove and lands being registerable with said valve passage for respectively opening and closing said passage, a return passage on said casing communicating with said outlet passage, said casing including a valve opening communicating with said divider passage and said return passage, said opening being axially disposed relative to said valve plunger, a poppet valve on said casing movable toward and away from said valve opening, means urging said poppet valve toward said valve opening, said poppet valve having a restricted orifice, a conduit communicating with said orifice, said valve plunger in open position providing for the flow of fluid from said inlet passage through said valve passage to said outlet passage, said valve plunger in a first closed position providing for the maximum flow of fluid from the inlet passage to said divider passage, whereby a certain volume of fluid flows through said orifice to said conduit and the rest of said fluid flows through said return conduit to said discharge passage, and blocking means on said valve plunger movable therewith to a second closed position whereby said blocking means partially blocks said orifice to restrict the flow therethrough whereby a lesser volume of fluid is delivered to said conduit and the remainder of fluid flow is delivered to said return passage.

4. A flow control device comprising a housing having an inlet passage and an outlet passage in concentric alignment, a valve passage concentric with and connecting said inlet and outlet passages, a divider passage communicating with said inlet passage, a valve, said valve including means registerable with said valve passage for respectively opening and closing said passage, a return passage on said casing communicating with said outlet passage, said casing including a valve opening communicating with said divider passage and said return passage, said opening being axially disposed relative to said valve plunger, a poppet valve on said casing movable toward and away from said valve opening, means urging said poppet valve toward said valve opening, said poppet valve having a restricted orifice, a conduit communicating with said orifice, said valve plunger in open position providing for the flow of fluid from said inlet passage through said valve passage to said outlet passage, said valve plunger in a first closed position providing for the maximum flow of fluid from the inlet passage to said divider passage, whereby a certain volume of fluid flows through said orifice to said conduit and the rest of said fluid flows through said return conduit to said discharge passage, and blocking means on said valve plunger movable therewith to a second closed position whereby said blocking means partially blocks said orifice to restrict the flow therethrough whereby a lesser volume of fluid is delivered to said conduit and the remainder of fluid flow is delivered to said return passage.

5. A flow control device including an inlet passage adapted to connect to a source of fluid under pressure, an outlet passage communicating with said inlet passage, a valve movable into positions to block the flow of fluid from said inlet passage to said outlet passage or to permit the flow of fluid therethrough, a divider passage communicating with said inlet passage, a return passage communicating with said outlet passage, a valve arrangement including an opening adapted to provide for communication between said divider passage and said return passage, a second valve movable toward and away from said opening to regulate the fluid flow through said opening to said return passage, said second valve having an opening restricted relative to said valve opening, a conduit communicating with said restricted opening, said first valve being movable from an open position to block the flow of fluid whereupon said second valve is moved away from said valve opening and a certain volume of fluid flows through said restricted opening and a certain volume flows to said return opening, said first valve being movable to a second position to block the flow of fluid, and means on said first valve cooperable with said restricted opening to further restrict the same whereupon said second valve is moved a greater distance from said valve opening and said flow of fluid through said restricted opening is further restricted.

6. A flow control device including an inlet passage adapted to connect to a source of fluid under pressure, an outlet passage directly communicating with said inlet passage, a valve movable into positions to block the direct flow of fluid from said inlet passage to said outlet pasage or to permit the dirsect flow of fluid therethrough, a divider passage communicating with said inlet passage, a return passage communicating with said outlet passage, a valve arrangement including an opening adapted to provide for communication between said divider passage and said return passage, a second valve movable toward and away from said opening to regulate the fluid flow through said opening to said return passage, said second valve having an opening restricted relative to said valve opening, a conduit communicating with said restricted opening, said first valve being movable from an open position to block the direct flow of fluid whereupon said second valve is moved away from said valve opening and a certain volume of fluid flows through said restricted opening and a certain volume flows to said return opening, said first valve being movable to a second position to block the flow of fluid, and masking means on said first valve movable into contiguous relation to said restricted opening to further restrict the same whereupon said second valve is moved a greater distance from said valve opening and a lesser volume of fluid passes through said restricted opening.

7. A flow control device including an inlet passage adapted to connect to a source of fluid under pressure, an outlet passage directly communicating with said inlet passage, a valve movable into positions to block the direct flow of fluid from said inlet passage to said outlet passage or to permit the direct flow of fluid therethrough, a divider passage communicating with said inlet passage, a return passage communicating with said outlet passage, a valve arrangement including an opening adapted to provide for communication between said divider passage and said return passage, a second valve movable toward and away from said opening to regulate the fluid flow through said opening to said return passage, said second valve having an opening restricted relative to said valve opening, a conduit communicating with said restricted opening, said first valve being movable from an open position to block the direct flow of fluid whereupon said second valve is moved away from said valve opening and a certain volume of fluid flows through said restricted opening and a certain volume flows to said return opening, said first valve being movable to a second position to block the flow of fluid, and means on said first valve movable therewith to further restrict the flow through the restricted opening whereupon said second valve is moved a greater distance from said valve opening.

References Cited in the file of this patent
UNITED STATES PATENTS

| 2,293,906 | Kvavle et al. | Aug. 25, 1942 |
| 2,880,747 | Newcomb | Apr. 7, 1959 |

FOREIGN PATENTS

| 800,951 | Great Britain | Sept. 3, 1958 |